United States Patent [19]

Schroeder

[11] Patent Number: 5,217,308

[45] Date of Patent: Jun. 8, 1993

[54] LINEAR MOTION ROLLER CONTACT BEARING ASSEMBLY WITH BEARING RACE INSERTS

[76] Inventor: Robert Schroeder, 3044 Imperal Oaks Dr., Rockford, Ill. 61111

[21] Appl. No.: 890,529

[22] Filed: May 28, 1992

[51] Int. Cl.⁵ ............................................. F16C 29/06
[52] U.S. Cl. ...................................................... 384/45
[58] Field of Search .................................. 384/43–45; 74/89.15, 89.2

[56] References Cited

U.S. PATENT DOCUMENTS

| | | |
|---|---|---|
| 3,008,774 | 11/1961 | Morris et al. |
| 3,311,426 | 3/1967 | Binns . |
| 4,025,995 | 5/1977 | Thomson . |
| 4,128,278 | 12/1978 | Headen et al. |
| 4,391,473 | 4/1983 | Teramachi . |
| 4,489,990 | 12/1984 | Teramachi . |
| 4,576,421 | 3/1986 | Teramachi . |
| 4,692,038 | 9/1987 | Kasai ............ 384/45 |
| 4,775,247 | 10/1988 | Isert ............ 384/43 |
| 4,934,835 | 6/1990 | Albert ............ 384/43 |
| 4,941,197 | 7/1990 | Roeser ............ 384/44 |
| 5,067,823 | 11/1991 | Kasuga ............ 384/45 |
| 5,074,160 | 12/1991 | Kasuga ............ 384/45 |

FOREIGN PATENT DOCUMENTS

| | | | |
|---|---|---|---|
| 200016 | 9/1987 | Japan ............ | 384/43 |
| 9118219 | 11/1991 | World Int. Prop. O. ............ | 384/43 |

OTHER PUBLICATIONS

ROIbot C Series Linear Actuators, Toshiba International Corporation, Industrial Division, Houston, Tex. No Date.
LM Guides, pp. 2, 3, 4, 5, 180, 181 No Date.
Rapidtrak R. Linear Actuators, pp. 1–15, 18–19, 30–33, Warner Electric, Copyright 1990.
Tsubaki Linear Motion System Series.
TOL-O-MATIC Band Cylinders TM, Tol-O-Matic, Inc., Minneapolis, Minn., Copyright 1985, 1987.
Components for linear motion, pp. 28, 29, 4, 5, 9 No Date.
Techno Patented Linear Bearing System No Date.
Guides, pp. 129–141 No Date.
BACO Positioning System, Rose & Krieger No Date.
TOSHIBA ROIbot SV Series DC Servo Actuators, Toshiba International Corporation, Industrial Div., Houston, Tex. No Date.

Primary Examiner—Thomas R. Hannon
Attorney, Agent, or Firm—Lathrop & Clark

[57] ABSTRACT

A linear motion guide assembly is disclosed which employs an extruded U-shaped aluminum channel with inserted hardened steel races. A linear slider having recirculating roller element bearings which is slidably mounted upon the extruded track. The load bearing races of the recirculating bearings are opposed to in a spaced parallel relation to the insertable bearing races of the track. The track has linearly extending structures substantially parallel to the track races the structure being of substantially decreased stiffness so forming elastic hinges which supply an elastic pre-load between the track and the linear slider and wherein the lower modulus of the housing and the hinged structure allow significant deflection of the housing without excessively pre-loading the bearings.

33 Claims, 6 Drawing Sheets

LINEAR MOTION ROLLER CONTACT BEARING ASSEMBLY WITH BEARING RACE INSERTS

FIELD OF THE INVENTION

This invention relates to linear motion assemblies in general and to linear motion assemblies employing bearings of the recirculating roller element type in particular.

BACKGROUND OF THE INVENTION

Linear motion guides are an important component used in the construction of modern automated equipment. A linear motion guide consists of a linear slider constrained to move with a single degree of freedom along a track. Linear motion guides may be used to position a workpiece, a robotic arm or other object along a line. They may also be used in combinations of two or more to position a workpiece or the like in two or three dimensions. To ensure accurate positioning of the slider along the track, it is desirable that the sliding interface between the linear slider and the track be of a low friction design. It is further desirable that the slider be firmly held on the track without play or slop or backlash so that the linear slider may be repeatedly and accurately positioned on the slider track.

Reasonable cost and modularity are also desirable attributes of a linear slider. They are particularly desirable when taking advantage of modern computer motion controls to develop automated equipment for a particular application.

In known linear motion guide assemblies, the objective of lower cost has tended to conflict with the desire for tightly toleranced bearings and low sliding friction.

One type of cost-effective bearing employs low friction bushing type bearings which do not achieve the extremely low friction available with bearings employing recirculating roller elements.

Another type of known linear motion guide assembly employing recirculating ball bearings requires that the track and slider be constructed of a high modulus, high strength material like steel. However, the use of steel necessary to form the hard resilient races for the ball bearings demands high tolerances for the track and slider. Because of the high modulus of the steel, only small deflections to eliminate tolerances between the track and slider may be used. Large deflections of the high modulus steel track or slider result in excessive pre-load of the roller elements which results in rapid bearing wear and higher bearing friction. The need for high tolerances in the slider and the track to avoid excessive pre-loads while at the same time eliminating play in the bearings results in a high cost linear motion assembly.

One type of known bearing uses a deep slit in one side of a linear slider which in combination with a biasing screw may be used to pre-load some of the linear ball bearings. However, this type of linear bearinq unit does not pre-load all of the bearings and has the disadvantage of creating a region of high stress at the bottom of the groove which could lead to failure of the slider.

Another known linear slider arrangement has an inserted hardened steel race connected to the bottom of a U-shaped aluminum extrusion. Linear ball bearings of the recirculating type ride against this inserted race. The position of the race on the U-shaped housing is adjustable by means of screws which attach the race to the housing. This type of linear slider assembly has a relatively small base for reacting against off-center slider loads. All loads must react by bearing against a relatively narrow race which is adjacent to one side only of the linear slider.

Another type of known linear guide apparatus employs a U-shaped aluminum extrusion which contains a pair of opposed hardened steel races which are press-fit within opposite sides of the upwardly extending sides of the U-shaped extrusion. In this type of linear guide, the gravity loads of the linear slider and the equipment mounted thereon must be transmitted as sheer forces through the linear ball bearings which tends to limit the contact area between the recirculating ball bearings and the surface of the inserted hardened races. Furthermore, no means is provided for eliminating slop or tolerance between the linear slider races and the U-shaped housing races.

What is needed is a linear guide assembly which may be cost-effectively assembled without play or slop between the slider and the track while at the same time having high load carrying capability and low friction bearings.

SUMMARY OF THE INVENTION

The linear motion guide assembly of this invention has a slider track which is formed of an aluminum extrusion. The motion guide track is U-shaped and has four race inserts formed of cold drawn heat treated wire steel. The races are pressed within four channels which face the interior portion of the U-shaped track. A linear slider is positioned between the four track races. The linear slider in turn has four race inserts disposed in parallel spaced relation to the races of the track. Disposed between the track races and the slider races in load bearing engagement are a plurality of roller load bearing elements, typically spherical ball bearings. The linear slider has nonload-bearing return races which allow the roller elements to recirculate in a closed path between one end of the slider load-bearing race and the other. The bearing return race passes through and is contained within the linear slider body. The linear slider body may conveniently be formed of machined or molded plastic. The aluminum extrusion which forms the track of the linear motion guide assembly is composed of stiff race support segments joined by more flexible sections which form elastic hinges therebetween. The race support segments provide stiffness along the track in the direction of the linear motion of the assembly. The linearly extending lower stiffness sections form elastic hinges which allow the elastic pre-loading of the roller elements. The linear motion guide assembly described herein may be conveniently and cost-effectively made of varying lengths. The linear motion guide assembly may employ a variety of drive mechanisms and may incorporate feedback and computer control for repeatably and accurately positioning the slider along the track. Furthermore, various race and roller element configurations may be employed to achieve particular advantages.

It is an object of the present invention to provide a linear motion assembly with low slider friction.

It is a further object of the present invention to provide a linear motion assembly having high precision and repeatability of linear motion.

It is another object of the present invention to provide a linear motion assembly which is more cost-effectively manufactured.

It is also an object of the present invention to provide a linear motion assembly which provides elastic pre-load with a relatively low modulus of elasticity so that the bearings have a light pre-load and zero play.

It is a still further object of the present invention to provide a linear motion assembly incorporating drive means for repeatedly positioning a linear slider on the slider track.

It is yet another object of the present invention to provide a linear motion assembly employing roller element bearings of greater load bearing capability.

Further objects, features, and advantages of the invention will be apparent from the following detailed description taken in conjunction with the accompanying drawings.

DESCRIPTION OF THE PREFERRED EMBODIMENT

Figure 1:
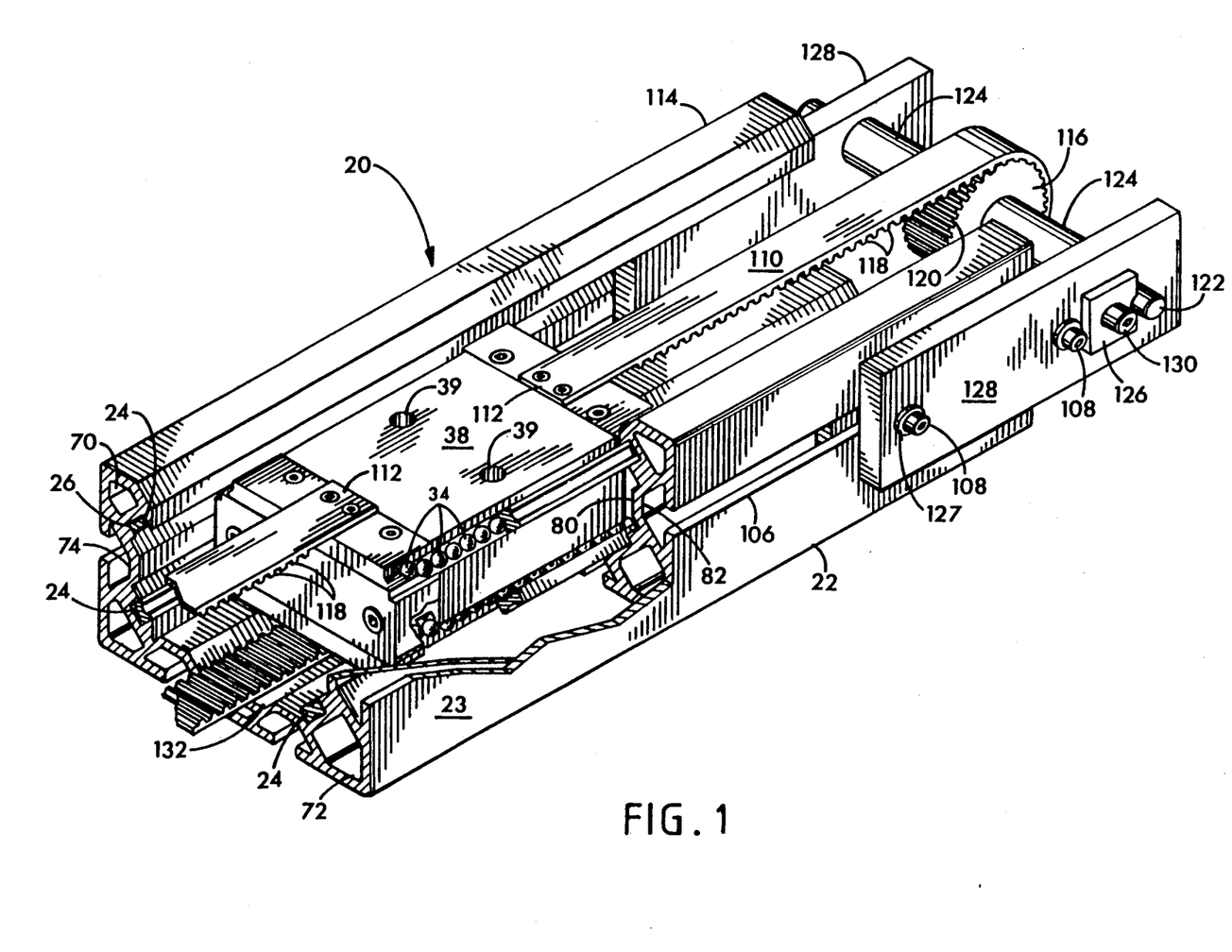
FIG. 1 is a fragmentary partially cut-away isometric view of the linear motion assembly of this invention employing a drive belt mechanism for linear movement.
Figure 2:
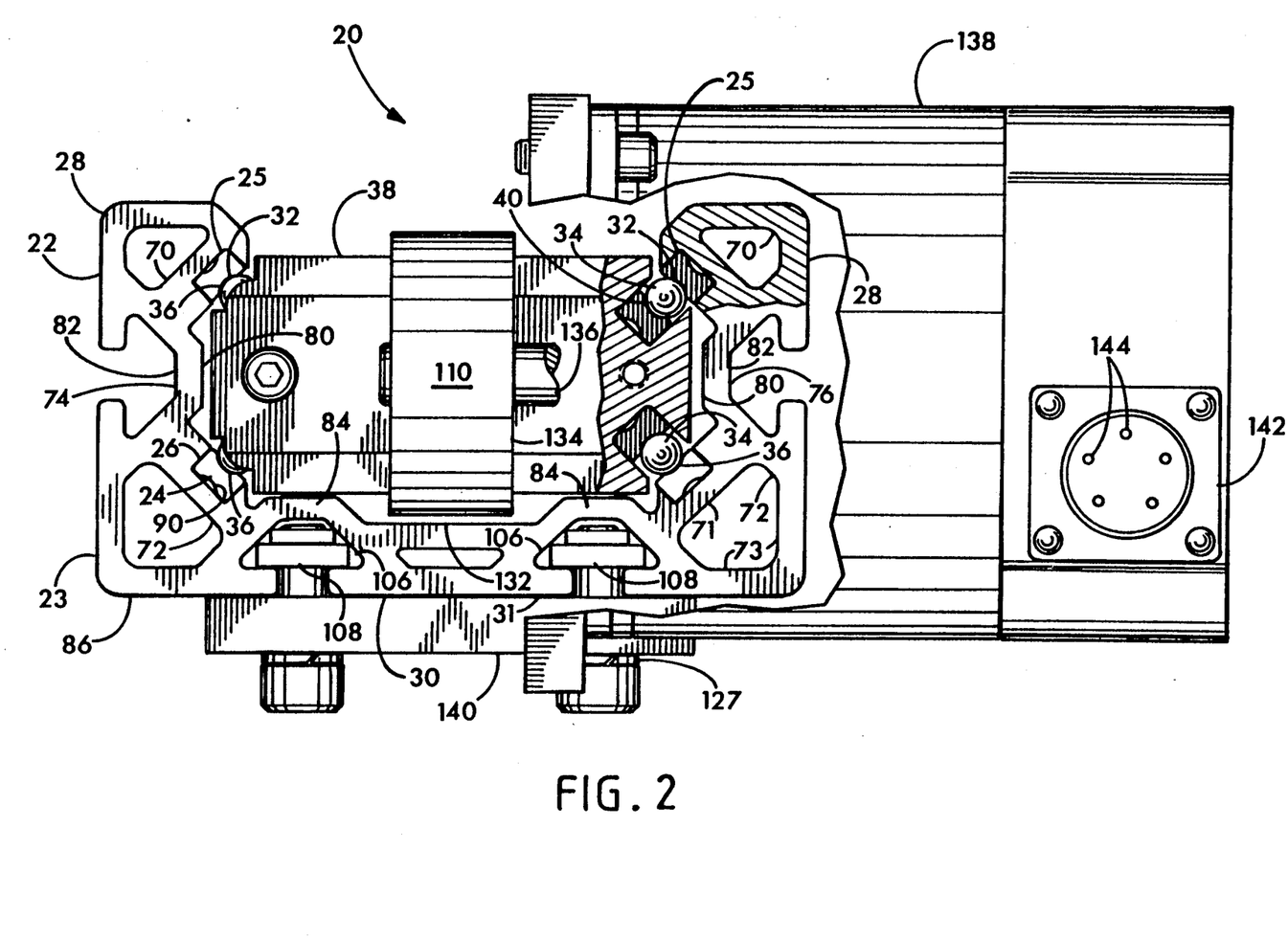
FIG. 2 is an end view partially cut away of the device of FIG. 1.

Referring more particularly to FIGS. 1-11, wherein like numbers refer to similar parts, a linear motion assembly 20 is shown in FIGS. 1 and 2. The linear motion assembly 20 has a slider track 22 constructed from an aluminum extrusion. The track 22 is U-shaped and has four bearing races 24 which are formed of hardened steel and are press fit within channels 26 which are integral with the track 22. The track race inserts 24 are formed from cold drawn heat treated steel wire bar.

As best shown in FIG. 2, the track 22 is U-shaped in cross section and has two upstanding arms 28 which extend upwardly from a horizontal base 31 having a relatively flat bottom 30. The hardened steel races 24 have concave ball grooves 32 which run the length of each race and upon which ball bearing roller elements 34 ride. The ball grooves 32 provide a line contact 36 with the ball bearings 34. The line contact 36 provides a relatively large area of contact between the ball bearings 34 and the races 24 which in turn allows the support of relatively large loads. Two of the four track races 24 face upwardly and two face downwardly to capture and support a slider 38 riding on recirculating roller element ball bearings 34 therebetween. The track is preferably extruded of Aluminum alloy 6061 T6.

Figure 3:
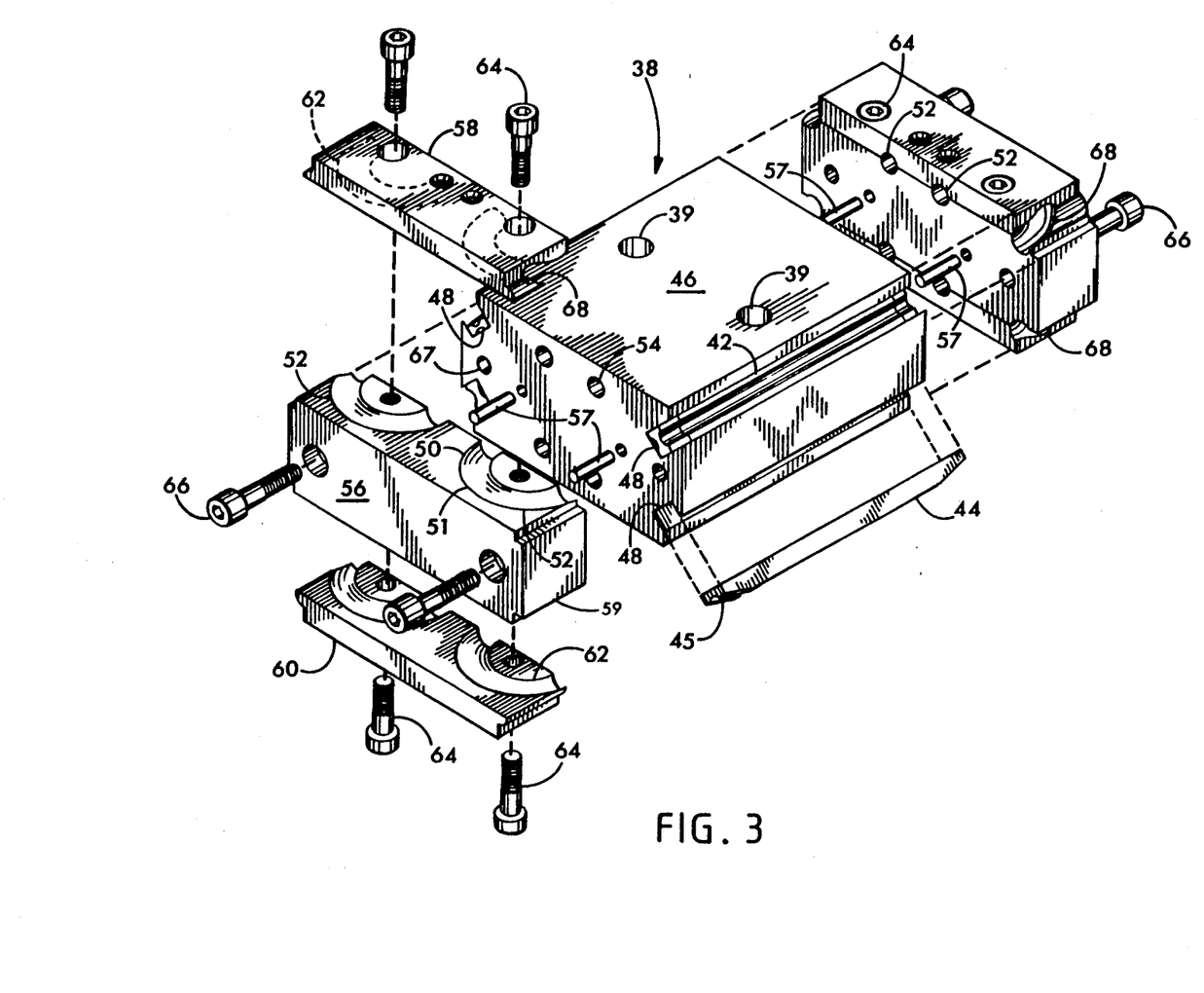
FIG. 3 is an exploded isometric view of the linear slider of the linear motion assembly of FIG. 1.

The slider 38, best shown in FIG. 3, contains four recirculating ball bearing assemblies 40. The assemblies 40 include load bearing portions 42 of roller element pathways which preferably are formed by race inserts 44 which are constructed of cold drawn heat treated steel wire bar. For low-cost manufacture, the track races 24 and slider races 42 may be formed from the same drawn wire stock. Each ball bearing assembly 40 comprises an insert race 44, a recirculation return and a plurality of roller elements 34. The ball races are preferably formed of a steel alloy such as 52100 steel.

The race inserts 44 are press fit within the body 46 of the slider 38 in channels 48. The load bearing races 44 are opposed in spaced parallel relation to the track races 24 in the slider track 22. A plurality of ball bearing roller elements 34 are disposed between the opposed load bearing races 24, 44 and provide for accurate and repeatable low-resistance sliding motion between the slider 38 and the track 22.

The four ball bearing assemblies 40 of the linear slider 38 each have ball return portions 50, with two turning sections 52, which change the direction of the roller elements in the end blocks 56, and a straight bore 54, which extends through the length of the slider 38. The turning sections 52 are machined or cast in place in the end blocks 56 of the linear slider 38. Each end block is assembled from an upper cover 58, a central segment 59, and a lower cover 60. The upper covers 58 and lower covers 60 each have curved race portions 62 which together with curved race portions 51 of the central segment 59 define the turning sections 52 of the bearing assembly 40. The non-load bearing components 46, 58, 59, 60 of the linear slider 38 may be formed of molded or machined plastic or machined aluminum or other suitable material. The slider races 42 have tapered ends 45 which direct the roller elements into the ball returns 50. The upper covers 58 and lower covers 60 have capture projections 68 which guide the ball bearings 34 away from the load bearing races 24, 42 and into the recirculating return races 50.

The covers 58, 60 are bolted to the central segment 59 by fasteners 64. The assembled end blocks 56 are connected to the slider body 46 by fasteners 66. The end blocks 56 are aligned with the body 46 by pins 57. The slider components may be machined from aluminum or steel, or, for low cost production, may be formed of molded plastic. The preferable plastic compounds are high durometer polyurethane, high glass fill nylon, or PEEK polymer (polyetheretherketone) with carbon fiber filler, preferably injection molded. Alternatively, the slider may be formed of compression molded polyester epoxies with glass or carbon fiber fillers.

In the design of a linear slider assembly, it is desirable to combine the attributes of low cost with a stiff lightweight track while still achieving high load carrying capabilities, low slider friction, and tight tolerances between the linear slider 38 and the track 22. The linear motion assembly 20 achieves these objectives by employing an aluminum extrusion which is lightweight yet is configured with high moment of inertia race support segment sections 70, 72 which provide stiffness in the direction of slider motion. The hardened steel races 24, 42 with ball grooves 32 provide line contact 36 between the load bearing races 24, 42 and the ball bearings 36 and thus allow for the support of relatively high loads with low friction between the slider and the track. Mounting holes 39 are provided in the slider 38 for convenient attachment of apparatus to be positioned by the assembly 20.

In a conventional linear motion assembly, the components must be built to extremely high tolerances in order to prevent play or slop in the bearings which is caused by the motion of the linear slider 38 transverse to the track races 24. In order to reduce the play or transverse tolerances, the bearing races 24 mounted in the track 22 are elastically pre-loaded against the ball bearings 34 of the bearing assemblies 40 on the slider 38. In a conventional linear motion assembly formed completely of hardened steel alloy, very little pre-loading is available. In conventional assemblies, because of high radial stiffness of the track or the linear slider, pre-loads are constrained to 0.0005 to 0.001 inches before the elastic pre-loads overload the ball bearings. Because of the high forces needed to cause small deflections in hardened steel alloys, little elastic movement is available to close up tolerances between the linear slider and the track. Excessive ball loading is easily induced by excessive deflection. Such ball overloading undesirably results in higher slider friction and excessive wear in the bearings. The linear motion assembly 20 has a track 22 formed of a material of low modulus of elasticity such as aluminum, magnesium or the like. Because aluminum and magnesium have moduluses three or four times less than that of steel, three or four times as much deflection is obtainable for a given elastic pre-load. However, even the advantages of a low modulus material used in the track 22 will not provide sufficient elastic deflections with relatively low forces if the track structure and geometry is excessively stiff. The linear motion assembly 20 achieves the needed elastic deflections in the slider track 22 by employing a linearly extending hinge structure 74, 76 of low radial stiffness which forms an elastic hinge which biases the upper races 24 inwardly and downwardly to remove tolerance between the track 22 and the linear slider 38.

The linear hinge portions 74, 76 are narrow plate-like vertical structures which extend along the track 22 parallel to the direction of slider motion. The hinge portions 74, 76 because of their relatively thin section and relatively extended height, create structures which allow the stiff, high moment of inertia race support segments 70, 72 to be deformed elastically inwardly towards the space between the U-shaped arms 28 wherein rides the slider 38.

Figure 4:
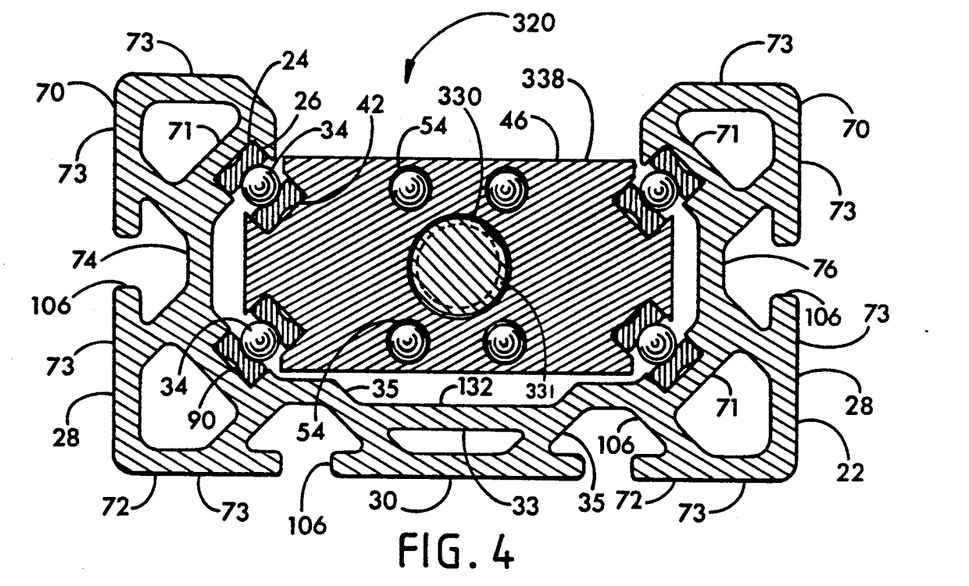
FIG. 4 is a cross-sectional view of an alternative embodiment of the linear motion assembly of this invention wherein the drive means is a drive screw arrangement.

Although there are many ways in which structures of high stiffness may be extruded, in the preferred track embodiment, shown in FIGS. 2 and 4, the substantially constant cross section track 22 has race support segments 70, 72, which are defined by a race member 71, which has portions defining the linear channel 26, and by two angled wall members 73 which extend from the race member 71 and join each other at a right angle. The integral race support segments are thus hollow, closed, tubular segments which provide stiffness to the races 24.

The race support segments 70, 72, are joined by hinge members 74, 76 respectively. The hinge members 74, 76, extend from the race members 71 and permit pre-loading of the slider roller elements. The base 31 of the track 24 has a hollow tubular segment 33 joined by single thickness members 35 to the lower race support segments 70, 72.

An additional advantage of the structure of the track 22 is its self-healing tendencies. The track is locally deformed outwardly as the slider passes over a track section. Thus a tendency of the metal to creep from constant elastic deformation is limited.

When the linear slider 38 is placed between the upward extending arms 28 it elastically biases the high stiffness race support segments sections 70 outwardly by means of the hinge structures 74, 76.

Figure 10:
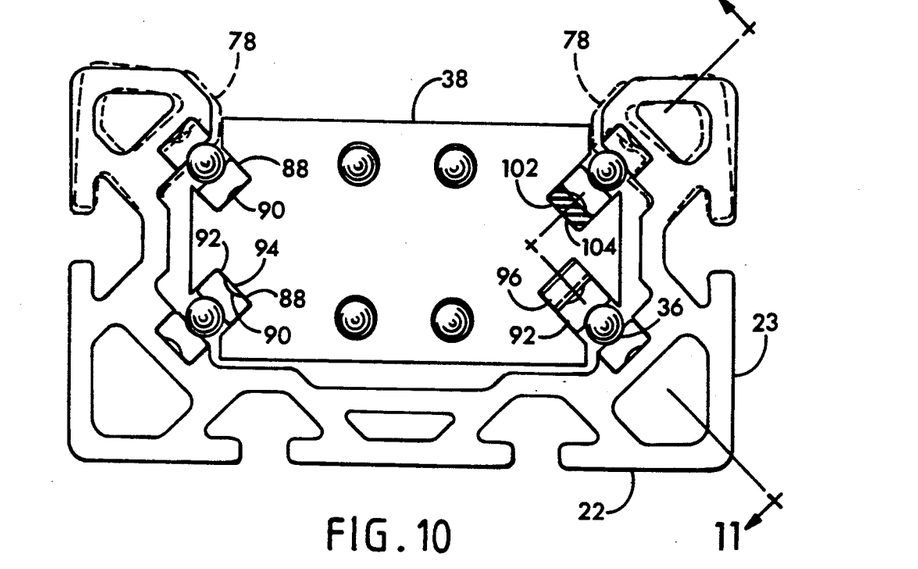
FIG. 10 is a cross-sectional view of the linear motion assembly of this invention employing alternative roller element bearing seating features.

The pre-load deflection 78 of the track 22 is shown in phantom and greatly exaggerated for clarity in the alternate embodiment assembly of FIG. 10. The elastic hinge sections 74, 76 are designed to minimize stress concentrations which can result in high local stresses. The sections 74, 76 minimize the impact of the cyclical loading caused by the linear slider 38 moving along the track 22. The hinges 74, 76 have inside portions 80 along which tension is developed in the material and external portions 82 along which compression forces are developed. Because the tensile and compressive strains in the elastic hinges 74, 76 are relatively smoothly distributed between the inside portions 80 and the external portions 82, the elastic hinge forces are developed in the hinge structures 74, 76 with a minimum of stress concentration.

Lower linear hinge sections 84, generally defined by members 35, may also contribute to the inwardly directed elastic clamping forces between the track 22 and the linear slider 38. The lower hinge sections 84 are of somewhat lesser effect due to their location more distal from the bearing assemblies 40 and because of the greater stiffness imparted by the clamping of the track to rigid mounts along the lower surface 86 of the track 22.

By forming the slider track 22 from an aluminum extrusion 23 with hardened steel drawn wire press-fit races, tracks of various lengths may be advantageously and at low cost made from the same basic components merely by cutting the materials to length. The ball races 24, 25 may be variously treated depending on the required application. For applications requiring only moderate tolerances, the track races 24, 25 may be used with the surfaces produced by cold drawing and heat treating processes. For more accurate, high tolerance, requirements, the races may be cost-effectively ground to high tolerances. Due to the separability of the insertable track races 24, 25 and similarly the races 42 on the linear slider, these parts may easily be subjected to well-known processes for increasing the wear resistance of machine tools such as case hardening, ion surface implantation and cold soaking.

The costly cold-drawing, heat treating, or other hardening or polishing processes, need not be applied to the larger, and hence more expensive to treat, track.

The load bearing races 42 of the linear slider 38 are mounted within grooves 88 shown in FIG. 2. The races 42 may be press fit within the grooves 88. The races 42, 24, 25 have indentations 90 which extend the length of the race and which mirror the ball grooves 32. The indentations 90 serve to reduce the amount of backside surface area 92 which comes in contact with the bottom 94 of the groove 88, thereby minimizing the likelihood that the bearing race 42 would fail to be firmly supported on the groove bottom 94. Thus, a small imperfection, inclusion, or chip of material in the slider groove 88 will tend to be forced to the center void formed by the indentation 90 rather than act as an unstable pivot point for the race 42.

Figure 11:
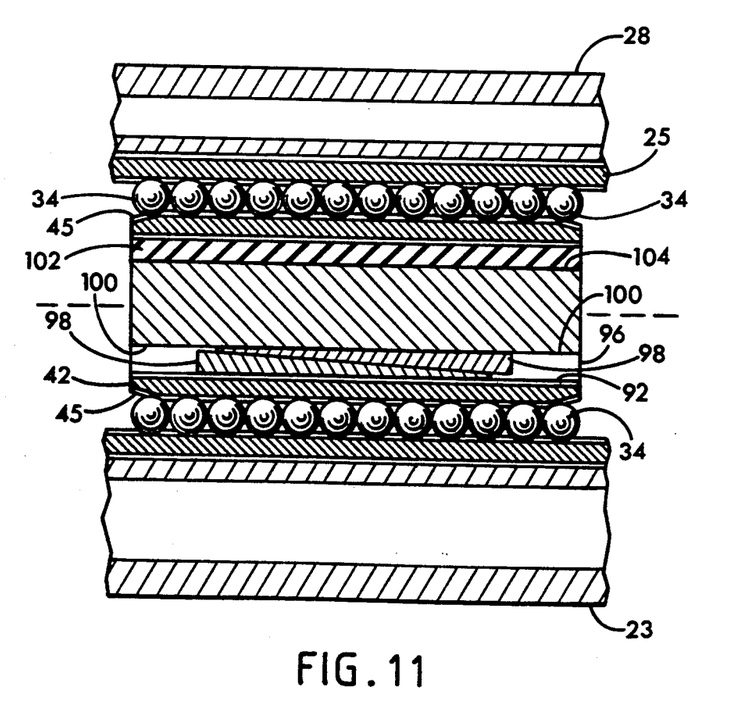
FIG. 11 is a cross-sectional view of the apparatus of FIG. 10 taken along section line 11—11.

The linear motion assembly 20 is illustrated in FIGS. 10 and 11 with illustrated alternative support structures for the load bearing races 42. Although the same support structures would generally be used for all races of the slider, different structures have been shown together for comparison purposes.

In some cases it may be desirable to adjust the depth of seating of a race 42 within a groove 96. This may be done by the insertion of opposed wedges 98 so as to underlie the back surface 92 of the race 42. The opposed wedges 98, shown in FIGS. 10 and 11, may be driven together to position the race 42 with respect to the groove bottom 100.

The opposed wedges 98 for positioning of the race 42 may advantageously be employed to remove play between the linear slider 38 and the track 22.

Another alternate mounting configuration for the races 42 is also shown in FIGS. 10 and 11. In this embodiment a resilient spacer 102 is bonded to the backside 92 of a race 42. The resilient spacer 102 is in turn bonded to the bottom 94 of a groove 104. The resilient spacer 102 performs two functions. It may bias the race 42 away from the bottom 94 of the groove 104 and hence pre-load the recirculating bearing 40. Furthermore, the resilient spacer as a result of its viscoelastic properties tends to damp vibration by absorbing vibrational energy. The cushioning and dampening of vibrational energy can reduce wear and improve accuracy of the linear motion assembly 20. This viscoelastic support of the linear slider races may be particularly important where equipment which is mounted on the linear slider 38 is a source of vibrational excitations. Alternatively, where the slider track 22 is mounted in a vibrationally noisy environment, the resilient spacers 102 may serve to isolate the linear slider 38 from some portion of the vibrational frequencies.

To facilitate the assembly of the slider track 22 and the linear slider 38 into a complete linear motion guide assembly the track 22 is advantageously formed with slots 106 for receiving double "T" nuts 108. The double "T" nuts 108 allow the ready attachment and repositioning along the length of the track 22 of additional subsystems necessary for the construction of a complete linear motion guide assembly 20.

One such complete assembly 20 is shown in FIGS. 1 and 2. The linear guide assembly 20 employs a looped drive belt 110 which has two free ends 112 which are mounted to the upper covers 58 of the linear slider 38. On one end 114 of the track 22 is mounted an idler wheel 116 over which the drive belt 110 passes. The drive belt 110 is of the timing belt type and has teeth 118 which engage with idler teeth 120 to provide non-slipping engagement between the idler wheel 116 and the drive belt 110. The idler wheel 116 is mounted on bearings (not shown) on an idler shaft 122 between spacers 124. The idler shaft 122 is retained by a retainer 126 to one of two idler mounting brackets 128 by a screw 130. The idler mounting brackets 128 are adjustably positioned along the track 22 by means of bolts with double "T" nuts 108 which may conventionally employ split ring washers 127 to prevent undesirable loosening of the double "T" nuts 108. The drive belt 110 passes over the idler wheel 116 and passes underneath the linear slider 38 where it rides within a drive belt groove 132 formed in the base 31 of the U-shaped aluminum track 22. The drive belt 110 engages with a drive wheel 134 mounted on the drive shaft 136 of a drive motor 138. Although not shown, the drive wheel also has teeth which engage with the drive belt teeth 118 and so prevent slippage between the drive wheel 134 and the drive belt 110.

The drive motor 138 will typically be of the stepping motor or servo type for positioning the linear slider 38 by means of the drive belt 110 under computer control. In order to facilitate feedback between the motor and the computer control a shaft position detecting device such as an optical or magnetic shaft encoder (not shown) may be coupled to the drive shaft 136.

The motor 138 is mounted to a motor bracket 140 which in turn is mounted to the track 22 extrusion 23 by means of bolts and double "T" nuts 108.

The drive wheel 134 and the idler wheel 116 are laterally adjustable along the track 22 by means of their mounting brackets and the double "T" nuts 108 to properly tension the drive belt 110 and to allow the ready replacement of the drive belt 110.

In order to facilitate the modularization of the linear motion assembly 20 the source of power and control for the feedback will preferably be through a standard connector innerface 142 such that the linear slider assembly 20 may be readily set up and plugged in to a source of power and control by means of connector 142 and contact pins 144.

Figure 5:
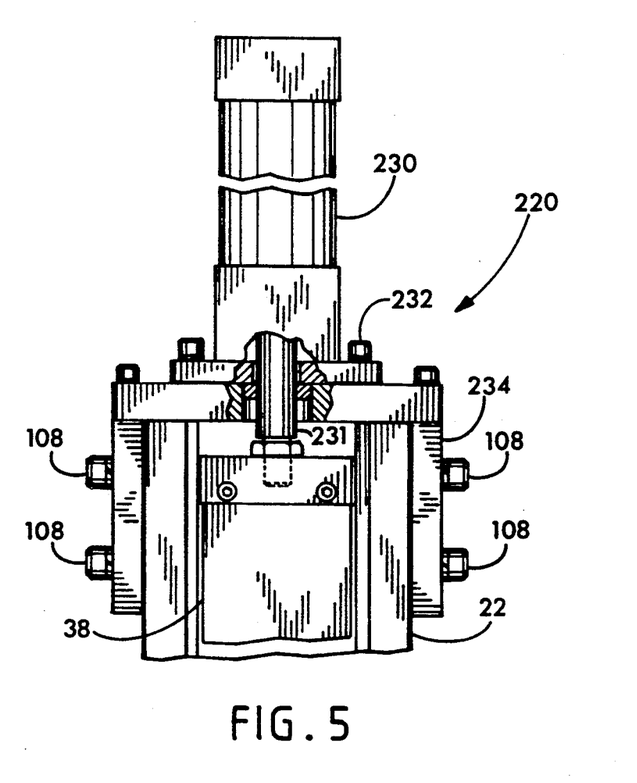
FIG. 5 is a fragmentary top view, partly cut-away, of an alternative embodiment of the linear motion assembly of this invention employing a pneumatic actuator.

Alternative embodiment air cylinder-actuated linear slider assembly 220, shown in FIG. 5, has a pneumatic actuator 230 mounted by screws 232 to a mounting bracket 234. The mounting bracket is affixed by means of double "T" nuts 108 to the linear track 22. The actuator 230 has a pneumatic piston 231 which is connected to the slider 38. The pneumatic actuator 230 will preferably be of the double-acting type such that the linear slider 38 may be moved back and forth along the track 22. The double-acting pneumatic actuator 230 may incorporate a linear transducer (not shown) to enable a computer controlled feedback loop to servo the linear slider 38 to a particular position along the track 22.

FIG. 4 is a cross-sectional view of a linear slider assembly 320 employing a ball and screw drive. A drive screw 330 extends through a central bore 331 in the slider 338 and is threadedly engaged with the linear slider 338. The drive screw 330 is caused to rotate by a drive motor (not shown) which will typically be mounted in a fashion similar to the pneumatic piston shown in FIG. 5. The motor has a shaft which may be an extension of the drive screw 232 or may be geared to the drive screw 232. Rotation of the drive screw 232 in one direction causes the linear slider 338 to move away from the drive motor and rotation in the opposite direction causes the linear slider 38 to move toward the drive motor. A shaft position transducer allows computer control with a feedback loop of the precise position of the linear slider 338.

Each type of linear motion guide assembly 20, 220 and 320 will be adaptable for differing applications. The pneumatic actuator 220 will typically be the fastest system for positioning the slider 238. The linear motion guide assembly 320 will typically be the slowest in positioning the linear slider 238 while also being best able to achieve high precision and repeatability of the linear slider 338 position. The drive belt linear motion guide assembly 20 is intermediate in terms of positioning accuracy and response time.

Recirculating ball bearing races are well known and widely used. However, for some applications recirculating bearings employing non-spherical roller elements may advantageously be employed. The alternative roller bearing assemblies 240, 540, 340, 440, shown in FIGS. 6-9, have been illustrated absent the track for clarity.

Figure 6:
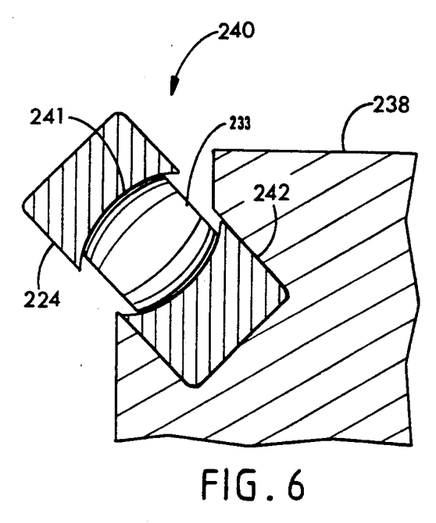
FIG. 6 is a fragmentary cross-sectional view of an alternative roller element and race employed in the linear motion assembly of this invention.

As shown in FIG. 6, alternative slider 238 has recirculating roller element bearings 240 employing crowned rollers 233 which ride on concave races 224, 242. Such roller elements may be employed where it is desirable to maximize the load bearing capability of the bearings. The larger contact area 241 between the roller elements 234 and the bearing races 224, 242 allows for the greater transfer of load for a given stress per unit area.

Figure 8:
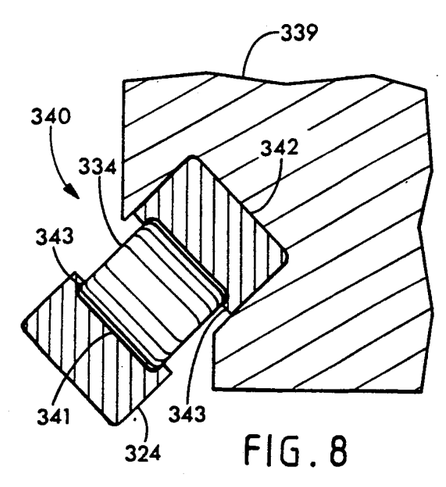
FIG. 8 is a fragmentary cross-sectional view of yet another alternative roller element and race employed in the linear motion assembly of this invention.

A recirculating roller element bearing assembly 340, shown in FIG. 8, is comprised of cylindrical roller elements 334 riding on grooved races 324, 342. The races have flat contact areas 341 and retaining side lips 343. The flat rollers 334 provide a large contact area 341 for the support of large loads through the bearing. Furthermore, the lips 343 serve to prevent lateral shifting or shearing between the bearing races 324, 342.

Figure 9:
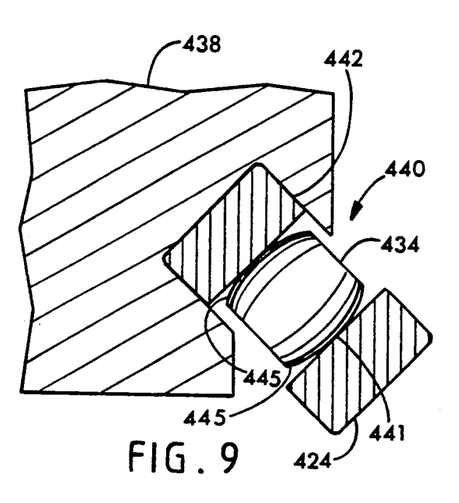
FIG. 9 is a fragmentary cross-sectional view of still another alternative roller element and race employed in the linear motion assembly of this invention.

A barrel-type roller bearing assembly 440 is shown in FIG. 9 which can accommodate angular misalignment between the bearing races 424, 442 while still having greater contact area 441 between the roller elements 434 and the races 424, 442 because of the comparatively large radius of curvature of the roller element bearing surface 445 as compared to a spherical ball bearing roller element.

Figure 7:
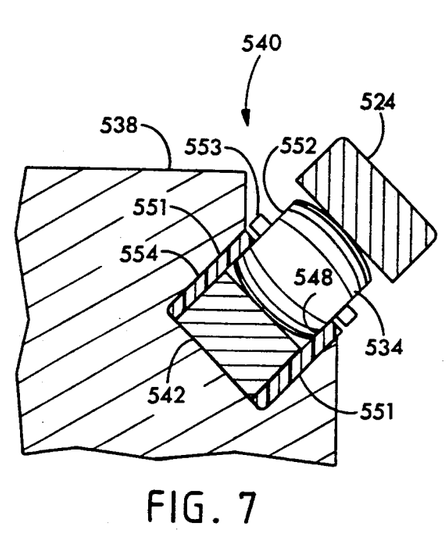
FIG. 7 is a fragmentary cross-sectional view of another alternative roller element and race employed in the linear motion assembly of this invention.

A recirculating roller element bearing assembly 540, shown in FIG. 7, has a planar race 542 with two upwardly extending synthetic roller side guides 551. The side guides 551 engage against the flat end surfaces 552 of the roller elements 534. Axial end poles 553 extend from the elements 534. The end poles restrict tilting of the elements 534 with respect to the sides 554 of the slider 538 bearing race 542 grooves 548. The roller side guides 551 constrain the roller elements 534 to a particular orientation with respect to the race 542 but allow the bearing assembly 540 to accommodate misalignment with the track race 524.

It should be understood that while particular recirculating element roller bearing assemblies are described, other types of bearing assemblies employing roller elements and races of varying configurations may be employed.

It should also be understood that wherein drive mechanisms employing a drive belt, a pneumatic cylinder and a drive screw are shown and described, other types of drive mechanisms including by hand, linear induction or linear slider motors, ACME screw with plastic nut or bronze nut, air motors, hydraulic cylinders, cross rollers hydraulic cylinders, chain or cable drives could be employed.

It should also be understood that wherein servo, stepper motors, and air cylinders are described other drive means including AC or DC motors with limit switches, air motors, hydraulic motors, and hand powered cranks may be employed.

It should also be understood that the particular orientation in space of the linear motion guide assembly is arbitrary and further that two or more linear motion guide assemblies may be mounted one upon the other to provide three or more axes of linear position control.

It should also be understood that although the bearing races are described as cold drawn heat treated wire races, the races could be formed from other hard wear resistant materials including ceramics and sintered powdered metals.

It should also be noted that the height dimensions and configuration of the track and the linear slider may be varied within the scope of the following claims.

It is understood that the invention is not confined to the particular construction and arrangement of parts herein illustrated and described, but embraces such modified forms thereof as come within the scope of the following claims.

I claim:

1. A linear motion guide assembly, comprising:
   a) a linearly extending track of substantially constant cross section, the track having a plurality of race support segments, wherein each support segment has a race member which has portions defining an inwardly facing channel, and the race member is connected to two angled wall members to define a hollow, closed, tubular race support segment, and wherein at least one race support segment is connected to an adjacent race support segment by a single hinge member, the hinge member permitting the connected support segments to be elastically deformed away from each other;
   b) a linearly extending hardened race mounted within each race member channel;
   c) a linear motion slider mounted within the track for slideable movement therein, the slider being supported on the track by a plurality of roller elements engaged against the track races, wherein the track is composed of a material of lower modulus of elasticity than the insertable bearing races, and each hinge supplies an elastic pre-load between the track and the linear slider and wherein the lower modulus of the track and the hinge member allows significant deflection of the housing and pre-loading of the roller elements without causing excessive loading in said roller elements.

2. The apparatus of claim 1 wherein the track has four race support segments, and two upper segments are joined to two lower segments by hinge members, and the two lower segments are connected.

3. The apparatus of claim 2 wherein the upper support segment races are angled 90 degrees from the two nearest races.

4. The assembly of claim 1 wherein the linear slider has inserted races with a higher modulus of elasticity and greater hardness than the linear slider to which they are mounted.

5. The assembly of claim 1 wherein the track races are formed of hardened steel and the track is formed of aluminum.

6. The apparatus of claim 1 wherein the track is a U-shaped aluminum extrusion having two arms which extend upwardly from a track base, and wherein a race support segment is formed in each arm, and two race support segments are beneath the arms in the track base.

7. The apparatus of claim 1 wherein the track has outwardly facing portions defining linearly extending slots adapted to receive double "T" nuts for the mounting of objects to the track and for mounting the track to additional structure.

8. The apparatus of claim 1 wherein the track has a first end and a second end, and further comprising:

a) a drive wheel rotatably mounted to the first end of the track;

b) an idler wheel rotatably mounted to the second end of the track; and c) a drive belt having a first end and a second end, the drive belt passing around the drive wheel and around the idler wheel and having its ends rigidly attached to the linear slider so that the slider may be made to transverse the length of the track in response to movement of the drive wheel.

9. The apparatus of claim 8 further comprising a motor mounted to the track in driving engagement with the drive wheel.

10. The apparatus of claim 1 further comprising a pneumatic actuator having an extensible pneumatic piston, wherein the pneumatic actuator is rigidly mounted to the track, and the pneumatic piston is mounted to the linear slider, the pneumatic actuator being adapted to cause linear motion of the linear slider on the track by extension and retraction of the pneumatic piston.

11. The apparatus of claim 1 further comprising a drive screw threadedly engaged with the linear slider and drivingly mounted to a motor fixed to the tracks wherein rotation of the drive screw by the motor causes the linear slider to traverse the track.

12. The apparatus of claim 1 wherein the roller elements are spherical ball bearings.

13. The apparatus of claim 1 wherein the linear slider has portions defining recessed race channels and further comprising races press fit within each slider channel.

14. The apparatus of claim 13 wherein the slider and track races have concave depressions for receiving and retaining the roller elements 15. The apparatus of claim 13 wherein the roller elements are crowned roller elements 16. The apparatus of claim 15 wherein the track and slider races each have portions defining a concave rolling surface and wherein the crowned roller elements have a profile which closely matches the concave surface of the races.

17. The apparatus of claim 15 wherein each crowned roller element defines an axis of symmetry and has portions forming short axially extending orientation pegs which extend along the axis, and wherein the slider and track races are substantially planar and wherein the slider races have two roller side guides which bracket the slider race along the direction defined by the motion of the roller elements.

18. The apparatus of claim 13 wherein the slider and track races are substantially planar.

19. The apparatus of claim 13 further comprising a resilient spacer positioned in each slider channel, wherein the insertable races overlie the resilient spacers and are thereby resiliently mounted to improve the damping characteristics of the apparatus.

20. The apparatus of claim 13 further comprising two opposed triangular wedges overlying one another and positioned in a slider channel, wherein an insertable race is press fit over the opposed wedges so that the slider race may be moved closer to an opposed track race by driving the opposed wedges together, thus allowing the fit to be adjusted.

21. The apparatus of claim 1 wherein the roller elements are substantially cylindrical, and define an axisymmetric rolling surface about that cylinder, and wherein the races in the slider and the track have concave depressions closely conforming to the rolling surface of the cylindrical rolling elements.

22. The apparatus of claim 1 wherein each race has a first concave depression for engaging against a roller element, and a second concave depression beneath the first concave depression and parallel thereto.

23. A linear motion guide assembly, comprising:

a) an track having a plurality of rigid reinforced race support segments, wherein each race support segment has portions defining an inwardly opening channel, and wherein at least one race support segment is connected to another race support segment by a relatively flexible hinge member, and wherein the track is extruded with each hinge member disposing the connected race support member inwardly in its relaxed condition;

b) a hardened race disposed within each race support segment channel;

c) a slider mounted to the track in sliding low-friction engagement, the slider having a plurality of hardened races, wherein each slider race corresponds to a track race and is spaced generally parallel inwardly from its corresponding track race; and d) a plurality of roller elements engaged between the slider races and the track races, the roller elements mounted for recirculating movement within the slider, and wherein the track hinges apply a preload to the rolling elements through the race support segments to closely engage the roller elements with the races.

24. The apparatus of claim 23 wherein the track has four race support segments, and two upper segments are joined to two lower segments by hinge members, and the two lower segments are connected.

25. The assembly of claim 23 wherein the linear slider has inserted races with a higher modulus of elasticity and greater hardness than the linear slider to which they are mounted.

26. The apparatus of claim 23 wherein the track is a U-shaped aluminum extrusion having two arms which extend upwardly from a track base, and wherein a race support segment is formed in each arm, and two race support segments are beneath the arms in the track base.

27. The apparatus of claim 23 wherein the track has a first end and a second end, and further comprising:

a) a drive wheel rotatably mounted to the first end of the track;

b) an idler wheel rotatably mounted to the first end of the track;

c) a drive belt having a first end and a second end, the drive belt passing around the drive wheel and around the idler wheel and having its ends rigidly attached to the linear slider so that the slider may be made to transverse the length of the track in response to movement of the drive wheel.

28. The apparatus of claim 23 further comprising a resilient spacer positioned in each slider channel, wherein the insertable races overlie the resilient spacers and are thereby resiliently mounted to improve the damping characteristics of the apparatus.

29. The apparatus of claim 23 further comprising two opposed triangular wedges overlying one another and positioned in a slider channel, wherein an insertable race is press fit over the opposed wedges so that the slider race may be moved closer to an opposed track race by driving the opposed wedges together, thus allowing the fit to be adjusted.

30. The apparatus of claim 23 wherein each race has a first concave depression for engaging against a roller element, and a second concave depression beneath the first concave depression and parallel thereto 31. A linear motion guide assembly comprising:
a) a linearly extending track having a plurality of inwardly facing hardened races;
b) a linear motion slider having a body with a plurality of bores extending therethrough, and two end blocks, one connected to each end of the slider in the direction of linear motion, wherein each slider end block has an upper cover connected to a central block segment and a lower cover connected beneath the end block segment, the covers defining with a central segment a plurality of curved ball return races which align with the slider body bores;
c) a plurality of hardened steel races inset into the slder body, wherein a race communicates with each ball return raceway to form a looped path; and
d) a plurality of roller elements engaged between the track races and slider races, wherein the slider races have tapered portions adjacent to each end block which directs roller elements out of engagement with the track races and into the ball return races.

32. The apparatus of claim 31 wherein the slider body and slider end blocks are formed of plastic.

33. The apparatus of claim 31 wherein the slider body and slider end blocks are formed of aluminum.

* * * * *